M. J. McCULLOUGH.
Tea and Coffee Pot.
No. 211,759. Patented Jan. 28, 1879.
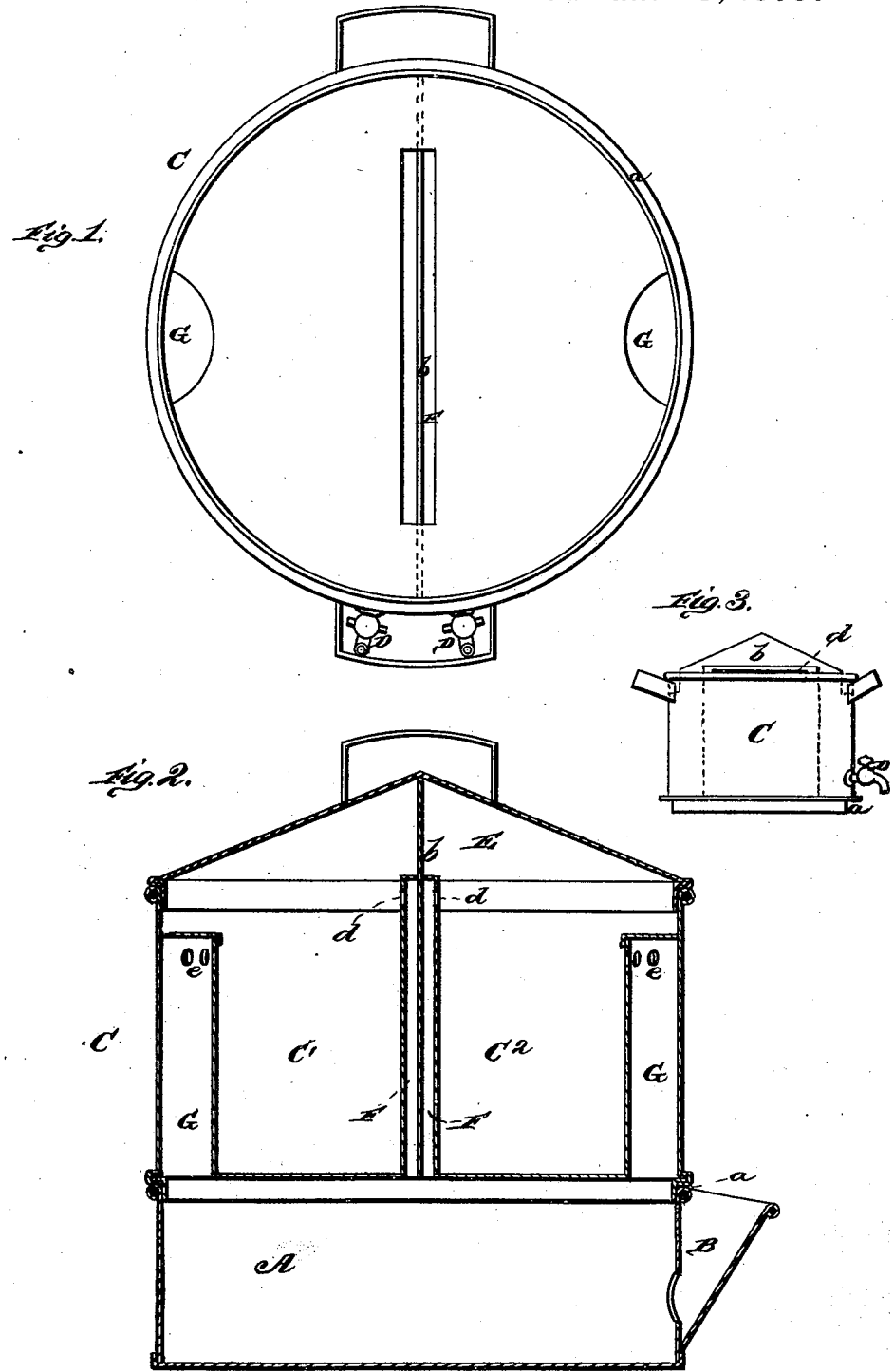

UNITED STATES PATENT OFFICE.

MARY J. McCULLOUGH, OF LAWRENCE, KANSAS.

IMPROVEMENT IN TEA AND COFFEE POTS.

Specification forming part of Letters Patent No. 211,759, dated January 28, 1879; application filed May 18, 1878.

*To all whom it may concern:*

Be it known that I, MARY J. McCULLOUGH, of Lawrence, in the county of Douglas and State of Kansas, have invented a new and valuable Improvement in Tea and Coffee-Pots; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a bottom plan view of my tea or coffee pot. Fig. 2 is a central vertical section. Fig. 3 is a side view.

My invention relates to a coffee and tea pot combined; and it is designed as an improvement upon the device patented to me November 27, 1877, No. 197,649, as a domestic boiler.

The construction and arrangement of parts in the present application adapts the device to serve as a combined coffee and tea pot, as will be more fully hereinafter set forth.

The annexed drawing, to which reference is made, fully illustrates my invention.

A represents the bottom vessel or steam-generator containing water to generate steam, and said vessel is to be placed on the stove. On the outside of the generator is a funnel, B, opening into the generator for supplying the same with air and water.

C represents the vessel, in which the tea and coffee are prepared. This vessel is made of such form and size, and provided at the bottom with a flange, $a$, to fit steam-tight in the generator A. The vessel C is provided with a central partition, $b$, arranged vertically, as shown, and dividing the vessel into two chambers, $C^1$ and $C^2$—one for coffee and the other for tea—said two chambers being provided near the bottom with faucets D D, to draw off the liquid, as required. This is mainly intended for hotels, restaurants, and similar places.

The cover E of the vessel C is constructed to fit tightly, not only around the edge of the vessel, but also over the edge of the central partition $b$, so as to prevent the steam and aroma from one compartment getting into the other.

The central partition $b$ in the vessel is provided with a narrow flue, F, on each side, said flues opening through the bottom of the vessel, and provided near the top with an elongated horizontal slot, $d$, so that the steam will pass upward from the generator below through the flues, and the slots $d$ into the two compartments of the vessel. Each compartment is further provided with one or more vertical tubes, G, opening through the bottom of the vessel, closed at the top, and provided on the side near the top with openings $e$, for the escape of the steam into the compartments or chambers $C^1$ $C^2$. The body of the vessel forms one side of each tube G, and these tubes may be of any desired form and size.

With the steam from the generator, hot air also enters the compartments, so as to cook or steep the tea and coffee with hot air and steam combined, cooking the same in a short time, and causing the tea and coffee to retain all the flavor and aroma with no loss or shrinkage, and with no possibility of its boiling over.

What I claim as new, and desire to secure by Letters Patent, is—

The combined tea and coffee pot described, consisting of the two vertical chambers $C^1$ $C^2$, steam-tight and separated by the partition $b$, the flues F $d$, stop-cocks D D, and the tubes G G $e$ $e$ formed upon one side by the walls of the vessel C, the whole adapted to serve in connection with a separate steam-generator, as shown and described.

In testimony that I claim the above I have hereunto subscribed my name in the presence of two witnesses.

MRS. M. J. McCULLOUGH.

Witnesses:
ARTHUR EVANS,
A. MARKS.